US 6,714,717 B1

(12) United States Patent
Lowe et al.

(10) Patent No.: US 6,714,717 B1
(45) Date of Patent: Mar. 30, 2004

(54) TIME BASE CORRECTOR

(75) Inventors: Virgil L. Lowe, Roswell, GA (US);
John W. Curtis, Lakemont, GA (US)

(73) Assignee: Fortel DTV, Atlanta, GA (US)

( * ) Notice: Subject to any disclaimer, the term of this patent is extended or adjusted under 35 U.S.C. 154(b) by 0 days.

(21) Appl. No.: 09/523,884

(22) Filed: Mar. 13, 2000

Related U.S. Application Data

(60) Provisional application No. 60/124,227, filed on Mar. 12, 1999.

(51) Int. Cl.[7] .............................. H04N 9/89; H04N 9/00; H04N 5/85
(52) U.S. Cl. ............................... 386/13; 386/44; 386/85
(58) Field of Search ............................... 386/13, 12, 16, 386/17, 21, 25, 44, 48, 49, 50, 71, 85, 88, 90, 113, 114, 24; 348/665, 669, 670, 662, 663; H04N 9/89, 9/00, 5/95

(56) References Cited

U.S. PATENT DOCUMENTS

| 4,297,728 A | 10/1981 | Lowe ........................... 360/36 |
| 5,204,787 A | 4/1993 | Suzuki et al. ............... 360/36.1 |
| 5,303,061 A | 4/1994 | Matsumoto et al. ........ 358/320 |
| 5,359,366 A | 10/1994 | Ubukata et al. ............ 348/536 |
| 5,424,849 A | 6/1995 | Yamashita et al. .......... 358/337 |
| 5,461,487 A | 10/1995 | Asakura ..................... 358/339 |
| 5,528,307 A | 6/1996 | Owada et al. ............... 348/497 |
| 5,557,335 A * | 9/1996 | Oh |
| 5,758,010 A | 5/1998 | Ando ........................... 386/87 |
| 5,767,800 A * | 6/1998 | Machida et al. |
| 6,300,985 B1 * | 10/2001 | Lowe et al. |

* cited by examiner

*Primary Examiner*—Robert Chevalier
(74) *Attorney, Agent, or Firm*—Womble Carlyle Sandridge & Rice, PLLC

(57) ABSTRACT

A time base corrector apparatus for removing time base errors from video signals. A voltage-controlled oscillator (VCXO) is locked to the chroma burst of the input signal. The VCXO is used to digitize the input video, to comb filter and to demodulate chroma signals. Time base correction is accomplished by lengthening or shortening each video line in sub-pixel increments by using an interpolator circuit to interpolate consecutive pixels. A sync error detector circuit determines the sync threshold position to sub-pixel accuracy. Sync error process logic circuit determines the integrated line length and line to line error. A coefficient generator determines the coefficients necessary to correct this error for every pixel. The interpolator then uses a polynomial interpolation technique. The interpolator compensates for too few pixels per line by compressing the stretched pixels to the proper size and by creating new pixels from a portion of the pixels immediately before and after the created pixel. Interpolator compensates for too many pixels per line by incorporating the values of the input pixels into the proper number of pixels by an interpolation technique. The pixel values are decimated and written to a write buffer.

36 Claims, 4 Drawing Sheets

TIME BASE CORRECTOR

CROSS-REFERENCE TO RELATED APPLICATIONS

This application claims the benefit of U.S. Provisional Application No. 60/124,227 filed Mar. 12, 1999. This application is related to co-pending and commonly assigned patent applications "Composite Video Decoder", Ser. No. 09/523,889 and "Digital Comb Filter", Ser. No. 09/523,888 filed concurrently herewith. Each co-pending patent application is hereby incorporated by reference into this description as fully as if here represented in full.

BACKGROUND OF THE INVENTION

The present invention relates generally to an apparatus for decoding of composite video to provide high quality serial digital output and, more particularly, to an interpolation circuit for removing any time-base errors on the composite video input.

The usual time base correction (TBC) technique is to lock the input digitizing and processing clock to the horizontal sync edge. The digitized video signal is then written to a memory with a clock that follows the time base errors of the input signal. The time base errors are removed when the digital data is read from memory with a stable clock. This technique was introduced in 1973 and described in U.S. Pat. No. 3,860,952 which issued Jan. 14, 1975 to Tallent et al. Another patent (U.S. Pat. No. 4,297,728) that issued on Oct. 27, 1981 to Lowe uses a charge-coupled device (CCD) shift register memory to remove time base errors. It discloses a technique of changing the delay time of the CCD shift register by changing the clock frequency. The clock is not locked to the horizontal sync or burst in this case. The frequency is increased to make the line shorter if it is too long, or the frequency is decreased to make the line longer to time the output to a reference signal.

There are many problems associated with all of the present TBC techniques especially when the write clock is also used for the comb filter processing. One problem that occurs when time base errors are present and the clock is locked to the sync signal is that the chroma cycles no longer line up between lines as they do when the write clock is locked to the burst signal. This causes a reduction in the luminance and chrominance separation which causes smears and beats in the output signal. Another problem is that time base errors usually exceed the frequency pull range of a voltage controlled crystal oscillator (VCXO), therefore, an LC oscillator must be used to follow the time base errors on the input. LC oscillators have a wider tracking range than VCXOs but they also have more phase noise and sync locked loops always have more residual errors than burst locked loops. While fairly good at removing medium to large time base errors, these problems usually cause some clock jitter which creates some time base error in digitizing a perfectly stable input signal. All residual timing errors reduce the luma/chroma separation.

A conventional time base corrector with digital comb filter is illustrated in FIG. 1. The comb filter in block 124 is typically an off-the-shelf chip with an analog-to-digital converter (ADC), 3 tap digital comb filter with one digital-to-analog converter (DAC) for the Y output and a second DAC for the C output. The main problem with this configuration is the requirement for two separate ADCs and DACs in the video path. Both the ADCs and the DACs cause some signal degradation. The off-the-shelf comb filter chips usually provide 8 bit processing with poor specifications. Time base correction is accomplished by locking the voltage controlled LC oscillator (VCLCO) in block 103 to the separated sync from block 101. The sync locked PLL (phase-locked loop) in block 102 and the VCLCO in block 103 typically produce approximately 10 ns of clock jitter on the write clock. The burst-locked PLL in block 113 and the VCXO in block 114 typically produce less than 1 ns clock jitter. The lower jitter rate is required for good luma/chroma separation in the comb filter.

The present invention uses a burst locked VCXO for the digitizing and processing clock to provide a very stable clock for comb filter separation of luma and chroma, demodulation of the chroma and noise immunity. The problem is that there is no inherent time base error correction using a stable write clock that is not locked to the sync signal. Therefore, a different time base error correction technique must be used to remove the time base error after the comb filter and chrominance demodulation if the circuit is to accept non-time-base-corrected inputs directly from VTRs. With this new technique, every pixel in every line of video is continuously and individually interpolated to a new positional value in sub-pixel increments as required to remove the time base error. This requires several multiplications of surrounding pixel values for every pixel position.

SUMMARY OF THE INVENTION

This invention provides a new and unique time base correction technique with unique supporting circuitry. Instead of using an LC oscillator that is locked to the sync of the incoming video, it uses a single voltage controlled crystal oscillator (VCXO) that is locked to the chroma burst of the input signal. This VCXO is used for digitizing the input video, comb filtering, and chroma demodulation. Time base correction is accomplished by lengthening or shortening each video line in sub-pixel increments by using digital interpolation of consecutive pixels. The start of line position and length of line is moved in full pixel and/or sub-pixel increments as needed to correct the signal to the desired position and line length. In this system the write clock is crystal stable while the video may have positional and frequency errors in comparison to the stable burst locked write clock. That causes the video signal to be digitized with more or fewer pixels per line than would be created with a sync locked write clock. That also means that the number of pixels per line and the pixel size do not meet International Radio Consultative Committee (CCIR) 601 standards when there are time base errors on the input. CCIR (now ITU-R) 601 is a recommendation adopted around the world for uncompressed digital video used in studio television production.

By using a unique error measurement circuit that detects the sync positional error on every line, the circuit is able to determine the positional error of the beginning of every line and the amount of stretch or compression error from the beginning of the line to the end. The circuit then determines the coefficients necessary to correct this error for every pixel from the beginning of every line to the end. One prior art technique is that of dropping pixels to time the signal to approximately the correct position. The pixel drop technique causes a discontinuity in the pixel stream that distorts a high frequency signal such as an edge or series of edges such as bars or patterns in a video signal. There is also a residual jitter problem created by the pixel drop technique. If the digitizing clock is 27 MHz each pixel value is 37 ns. That means the residual time base error will be 37 ns peak to peak (p-p) plus the error detection inaccuracy which is usually around 10 ns.

In this invention, pixels are not simply dropped or duplicated, however, the pixel values within a line are all stretched or compressed by continuously calculating new pixel values from the values of the original pixels so that the new position of every pixel is much more accurate than simply dropping or adding pixels. The correct number of interpolated pixels are as equally spaced as the original pixels although there may be more or fewer of them in the interpolated line than in the original line.

The interpolation circuit compensates for too few pixels per video line by compressing the stretched pixels that are present to the proper size and creating new pixels from a portion of the pixels immediately before and after the created pixel. The interpolation circuit compensates for too many pixels per line by incorporating the values of the input pixels into the proper number of pixels for a line of video by interpolation. It also compensates for too few pixels per line by incorporating the values of the input pixels into the correct number of pixels by interpolation.

In a preferred embodiment, three multipliers are used to create an accurate value for the new pixels. This technique creates a more accurate intermediate value pixel. For example, if the new pixel value is halfway between two input pixels, a two multiplier interpolator would simply multiply the pixels on either side by 0.5 and add the results. This technique works well for flat areas and linear slopes. However, when the two input pixels are on either side of the peak of a sine wave input signal the new pixel value will be only 70% of the desired amplitude. When three multipliers are used with an equation that uses data from the 4 surrounding pixels, they can incorporate a formula that considers the slope of the two pixels before the new pixel calculation and the slope after the new pixel. This technique is described more fully below. The result is a new pixel value that is extremely close to the desired value at the top of the sine wave.

Parallel four point interpolators are used for luminance (Y) and chrominance (C) data. Data from the interpolators is written into a buffer memory at the rate at which new pixels are created and skipped when pixels are dropped, but can be read from the buffer at a constant rate to smooth the pixel rate. The buffer may be combined with a larger frame memory for synchronization of the video signal or stand alone as a TBC correction buffer memory. The luminance (Y), R-Y (red minus white) and B-Y (blue-minus white) output signals from either the buffer memory or the frame memory are multiplexed into a 27 MHz CCIR-601 type signal with a B-Y, Y, R-Y, Y sequence. The time base corrected digital video signal could be converted back to analog at this point for many video applications, however, in a preferred embodiment of this invention, the digital signal is converted into a 270 Mb serial digital signal.

This invention uses several unique circuits to support the interpolation circuit to make a complete time base correction circuit. These include a unique error detection circuit and a unique noise immunity circuit. There is also a noise measurement circuit that is used to adapt the TBC to real world conditions with noise on the video input. The output from the noise measurement circuit can be used to modify the rate or gain of time base correction, comb filter fail thresholds, burst lock gain and noise correction gain.

The present technique uses more digital circuitry and less analog circuitry than the previous TBC techniques. When the previous TBC techniques were invented, the cost of digital circuitry was high and the cost of analog circuitry was low in comparison; but, since then, the cost of digital circuitry has dropped while the cost of analog circuitry has remained relatively constant. That makes this new technique practical to implement at this time and will make it even less expensive to implement in the future as the trend to lower digital costs continues. This new technique is also superior to the previous techniques in the accuracy of time base correction and in Y/C separation. It can be used to time base correct composite, component and separated Y/C signals.

BRIEF DESCRIPTION OF THE DRAWINGS

The invention is better understood by reading the following detailed description of the preferred embodiment in conjunction with the accompanying drawings wherein.

DETAILED DESCRIPTION OF THE PREFERRED EMBODIMENT

One embodiment of this invention uses a unique form of time based correction to remove jitter, skew errors and other time based errors from the separated luminance and chrominance signals. This circuit is necessary when the input comes from an unstable source like a VTR (video tape recorder) instead of a camera. This form of time base correction is necessary because previous time base correction techniques won't work after the signal has been digitized with a stable clock from a crystal oscillator.

There are two major objectives achieved by the invention. The first is to enable the separation of a composite video input to luminance and chrominance with a digital comb filter and the second is to remove any time base errors on the input with a unique interpolation circuit. Digital comb filters work well when the digitizing clock/write processing clock is locked to the burst of the video signal. When the write clock is locked to the color burst, the digitized chrominance sine waves line up perfectly from line to line for very good comb filter separation. The problem with digitizing by locking the clock to burst instead of to sync is that all time base errors in the input video will be passed through in the digitized video signal. This necessitates a new technique for eliminating the time base errors. This invention uses a process of interpolation to stretch, shrink and/or reposition digital video data to remove time base errors.

Figure 1:
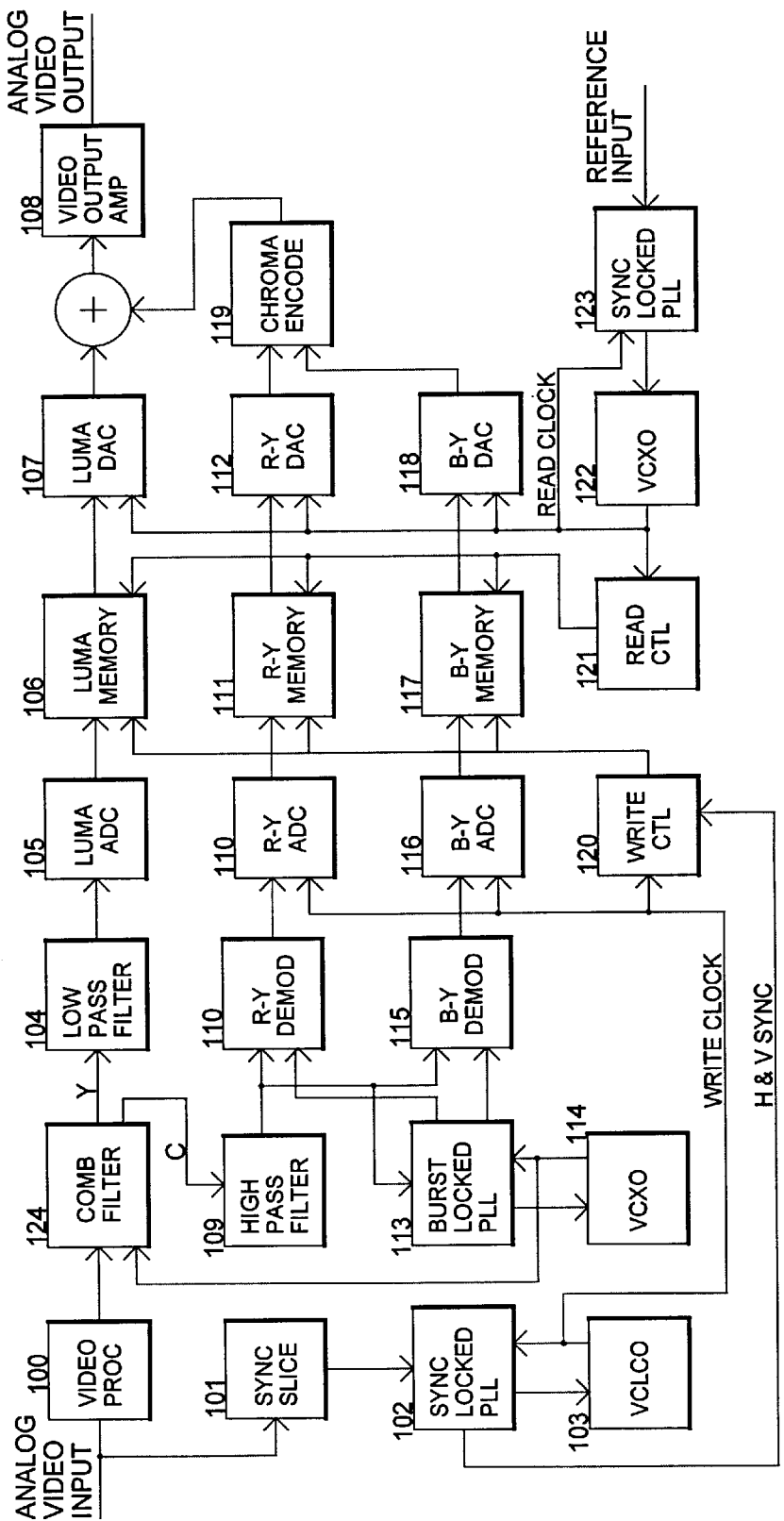
FIG. 1 is a block diagram of a conventional TBC with a digital comb filter.
Figure 2:
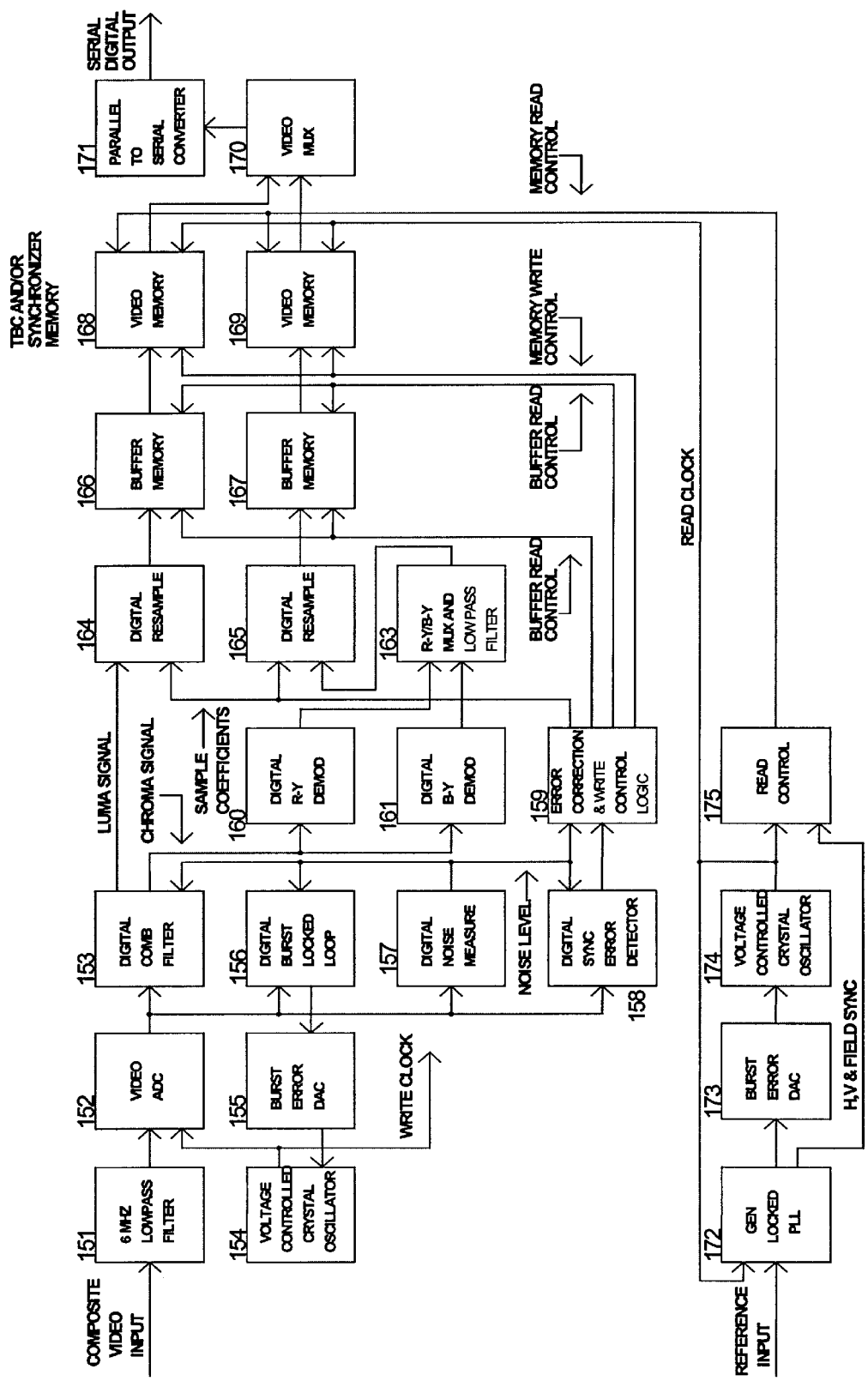
FIG. 2 is a block diagram of the video decoder with digital resampling time base corrector of the present invention.

In reference to FIG. 2, the input video processing circuit 151 contains an analog video amplifier, a clamp circuit for establishing the DC level required by the video ADC 152, and a low pass filter to remove high frequency components above the Nyquist frequency that may cause aliasing in the digitized video data. Block 152 is the video ADC (analog-to-digital Converter). Video ADC 152 and all circuits in the preferred embodiment of the invention are clocked with a 27 MHz write clock except for the circuits writing and reading the frame store memories 168 and 169 and the following output circuits 170 and 171. The 27 MHz write clock is twice the CCIR-601 luminance rate for convenience in making the final conversion to the desired digital output format. The digital output of video ADC 152 drives the digital comb filter 153 and the burst PLL 156 (phase-locked loop). Burst PLL 156 demodulates the chrominance signal with a multiplier using a sine coefficient, accumulates the result over the burst period and integrates the result. The output of burst error DAC 155 is an analog voltage that determines the frequency of the VCXO 154. The output of the VCXO 154 is the write clock which clocks the video ADC 152 to complete the burst phase locked loop. A burst gate from the input control logic 159 is used to gate the burst error accumulation and an input from the digital noise measure circuit 157 is used to control the burst PLL gain by reducing the amount of error from the burst period accumulation that is added to the long term burst error accumulator.

Figure 4:
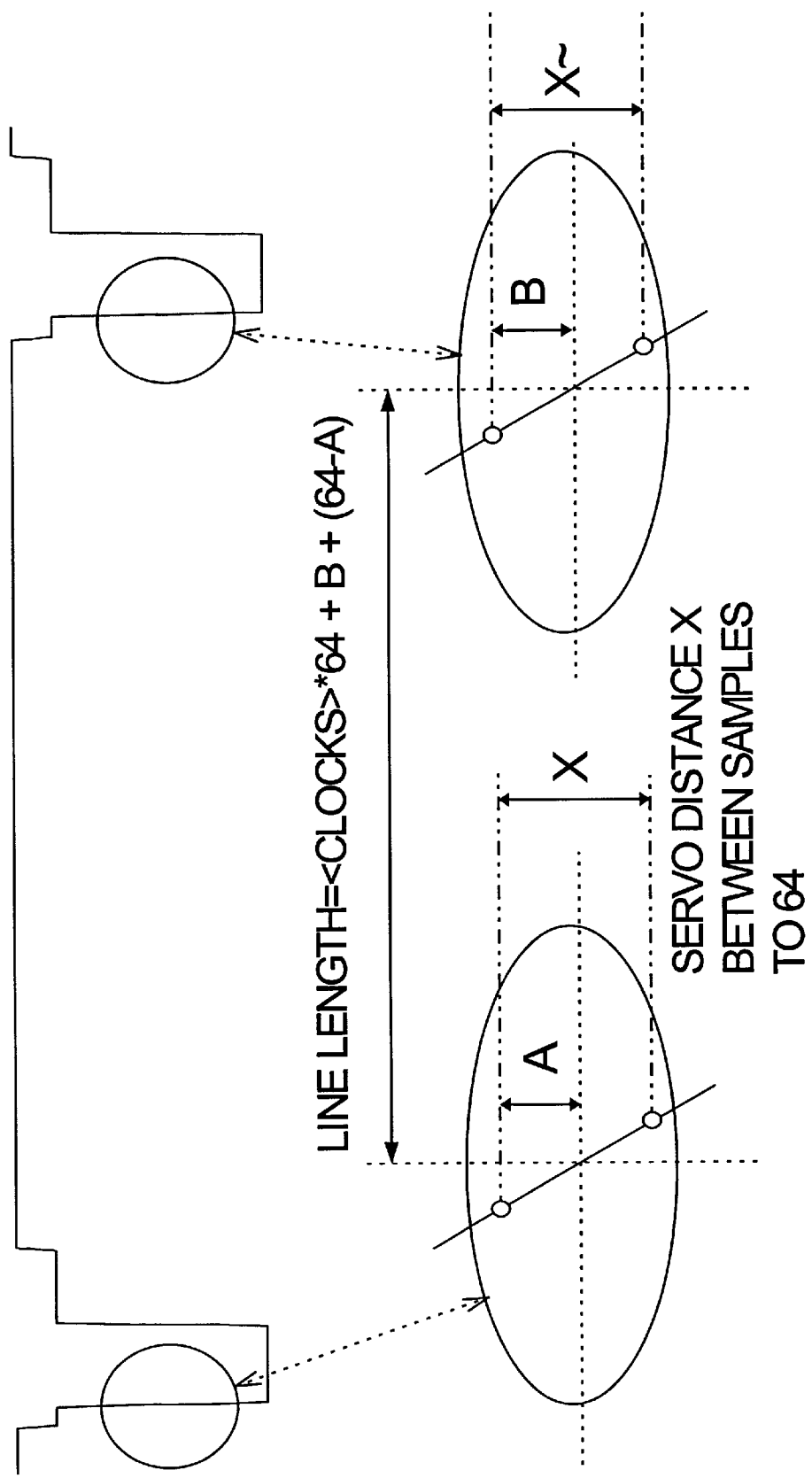
FIG. 4 illustrates the sync error calculation used in the present invention.

The digital sync error detector 158 detects the time the sync crosses a sync-detect threshold. Its purpose is to determine the exact start of every video line in pixel clocks and sub-clock increments. The output of digital sync error detector 158 drives block 159 which is the error correction logic and write control. Error correction and write control logic 159 generates the back porch clamp gate, the burst sample gate and all other necessary register gate enables and write control logic to control the buffer writes and reads. It also calculates the correction required to reposition each video line and stretch or compress it as required to correct for any time base errors. Error correction and write control logic 159 can also contain a TBC auto mode detector that determines if the input has time base error and can enable TBC mode control. The TBC is turned off in auto mode if the input is coherent where the sync is locked to the burst, and turned on in auto mode if the input is non-coherent where the sync and burst have a changing phase and/or frequency relationship. The auto mode can be disabled by the user operator mode controls that select TBC on, TBC off, or TBC auto. Error correction and write control logic 159 also determines the amount of time base correction needed for each line and the correction needed for each pixel as illustrated in FIG.4.

The chrominance output from the comb filter 153 is demodulated into the R-Y component by R-Y demodulator 160 and the B-Y component by B-Y demodulator 161. R-Y demodulator 160 contain a digital multiplier and a $\cos \theta$ look-up table for the coefficient. R-Y demodulator 161 contain a digital multiplier and a $\cos \theta$ look-up table for the coefficient because the B-Y component is offset 90 degrees from the R-Y component. The sampling rate of the data into R-Y demodulator 160 and B-Y demodulator 161 is 27 MHz and the clock rate of the multipliers is 27 MHz. The two 27 MHz data streams out of R-Y demodulator 160 and B-Y demodulator 161 are time multiplexed into a single 10 bit data stream at 54 MHz. Block 163 is a multiplexed digital low pass filter that filters each of the multiplexed R-Y and B-Y data streams independently but uses the same multipliers and adders alternately to gain efficiency of parts use.

The output from R-Y/B-Y multiplexer and low pass filter 163 goes to digital resample block 165 that is the interpolation circuit for chrominance time base correction. Digital resample block 164 is the luminance interpolator. It receives the 27 MHz luminance data from digital comb filter 153. Chrominance data is processed with two additional interpolators, one for R-Y and one for B-Y. The interpolation blocks may consist of two, three, four or more multipliers for interpolation, or may be a multiple point filter with loadable coefficients that determine the delay of the filter. A two point interpolator is less expensive and easier to implement, however, a four point interpolator can be used to more closely fit a curve between pixels with an interpolated pixel. Four point interpolation using three multipliers is used in the preferred embodiment to give good frequency response in the interpolator while using less hardware resources than a programmable filter. The three multipliers receive consecutive data samples to the multipliers. The multipliers also receive four coefficients from the error correction logic in block 159. The new pixels are created from the four surrounding pixels according to the coefficients that are determined by the error correction logic.

A residual time base error of 10 ns is normally considered to be very good. It is possible to determine the error to a sub-pixel value of less than 2 ns and correct linearly across every line for better than 10 ns residual error.

Once the error is determined it is divided by the number of pixels in a video line to become the incrementing value for the interpolation TBC. For example if the line is 1.5 pixels short and the line length should be 858 pixels, the error per pixel is 1.5/858=0.00175. This becomes the incremental value "I". In one embodiment of the invention the interpolation correction circuit may be two multipliers. The first multiplier receives the data from the first input pixel and the second multiplier receives the data from the second pixel. If the first pixel (raw pixel 1) in the line is in the correct position, the coefficient for the first multiplier is 1−0.00175=0.99825 and the second multiplier coefficient is 0.00175. The result of the two multipliers is added to become the new pixel 1. On the next clock cycle, the raw pixel 2 has shifted to multiplier 1 and raw pixel 3 has shifted to multiplier 2. The new coefficient is the result of adding the incremental value "I" to the value of the last increment "Ix". Therefore, new I+old Ix=new Ix, so on the second clock cycle 0.00175+0.00175=0.0035. The first multiplier receives 1−0.0035 as its new coefficient and the second multiplier receives 0.0035 as its coefficient. The third set of coefficients is 0.0035+0.00175=0.00525 and 1−0.00525. This pattern is followed throughout the line to obtain a gradual shift of the interpolated pixel between raw pixels to correct the input time base error in sub-pixel increments.

The digital video output from the preferred implementation of video decoder/TBC is a 10 bit CCIR-601 signal that is converted to a serial digital output. Although the preferred implementation is a CCIR-601 signal the technique is not limited to this standard and may be used for other standard and non-standard outputs. The CCIR-601 standard has a 13.5 MHz sample rate of the luminance (Y) signal for 720 active pixels of Y per line. It has 138 Y clocks of blanking, timing, audio and other data spaces per line in a 525 line system and 144 in a 625 line system. It also has a 6.75 MHz sample rate for the R-Y and B-Y chrominance signals for 360 active pixels for each of these signals plus the same number of blanking, timing, audio and other data spaces as the Y signal. There are 1716 total clocks per line of Y, R-Y, B-Y, timing, audio and data in 525 line systems and 1728 clocks in 626 line systems.

The interpolation circuits stretch and compress the pixels in a video line as necessary to remove time base error. This means that if a line has too many pixels at the fixed clock rate some pixels must be eliminated. Instead of arbitrarily or progressively throwing pixels away, all the pixels in the line will be stretched proportionally to fill in for the ones that are eliminated. When there are not enough pixels per line the pixels that are present are compressed linearly across the line and new pixels are generated from the surrounding pixels proportionally across the line. The data rate out of the interpolator is nominally decimated from 27 MHz at the input to 13.5 MHz at the output. When pixels are eliminated, write cycles to the buffer memories 166 and 167 are skipped although the read is constant. When new pixels are created, two buffer write cycles must be created occasionally at 27

MHz. The buffer memory depth must be adequate to compensate for the total time base correction error or other techniques used to compensate for too small a memory. The preferred technique is to provide for a memory wrap-around function that permits the memory control to replay lines of video by reading the same addresses twice before it is rewritten when there are too few lines per field. When there are too many lines in a field, the memory control skips a sequence of addresses to drop entire lines of video as necessary.

A one line memory or larger may be used to correct for time base errors without the following frame buffer memories 168 and 169. Also, a large buffer or a smaller buffer memory may be used in conjunction with a frame store memory. If a small buffer is used, the frame store memory must have the capability of occasionally writing at a higher rate than is read to compensate for having a high data rate from the interpolators during extreme video conditions such as tape search modes. Video frame buffer memories 168 and 169 are 16 bit by 1 Mb synchronous dynamic random access memories (SDRAMS) in the preferred embodiment, however, they may be any other type of digital memories with a combined storage of one or more frames of video for synchronization.

The time base corrected video data from the buffer memory may be converted to an analog output signal as in a conventional TBC. In the preferred embodiment the Y, R-Y and B-Y video data is multiplexed into a standard B-Y, Y, R-Y, Y sequence with CCIR-601 standard start of active video(SAV) and end of active video (EAV) codes added in video multiplexer block 170. The parallel data is converted to a standard 270 Mb serial digital signal in parallel-to-serial converter block 171. The parallel video data could be sent out through a connector or routed to other PC boards in other embodiments.

The read control and read clock are generated in a more conventional way than the write control and write clock except the genlock phase locked loop (block 172) is all digital except for a burst error DAC (block 173) generating an analog control voltage to the VCXO block 174. The sync detection circuit may be either analog or digital since the burst locked loop controls the fine frequency and phase lock in the genlock circuit. Read control block 175 is the read control logic that controls the horizontal and vertical read phases from the memories. Read control block 175 also generates the H, V and field data for the SAV and EAV addition in video multiplexer 170.

Figure 3:
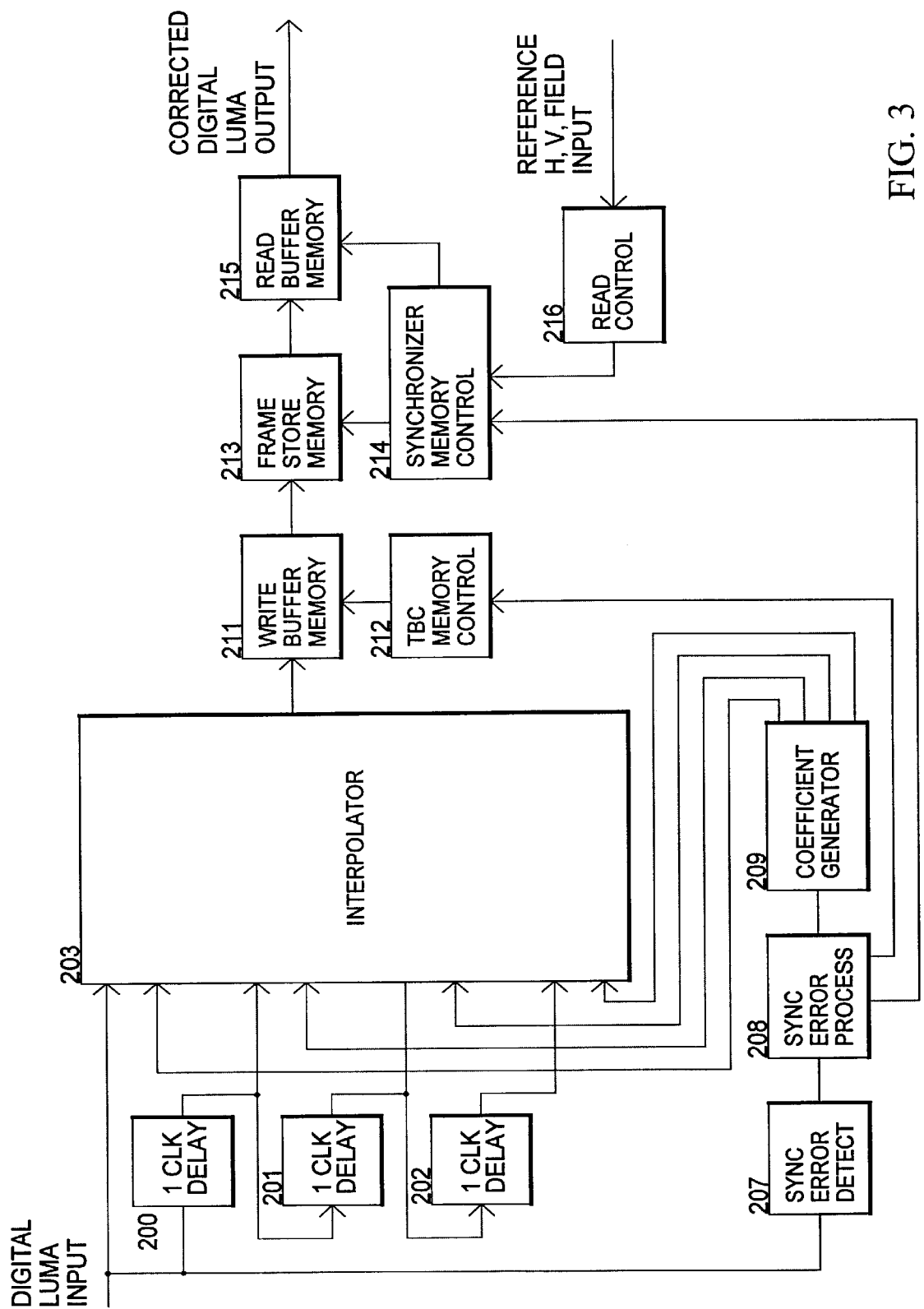
FIG. 3 illustrates the interpolation time base corrector block diagram of the present invention.

FIG. 3 is a detailed block diagram of the preferred embodiment of the TBC section of the video decoder. This TBC can stand alone with a stable clocked digital input that contains time base errors. For example an analog input of RGB, YUV or Y,R-Y,B-Y can be digitized with the read clock that is free running or locked to a reference source sometime known as a genlock source. In the video decoder, the input clock and digital data may not be synchronous with the reference clock.

In FIG. 3, block 200 is a one clock delay circuit that delays the input luma or R-Y/B-Y signal by one clock period. Blocks 201 and 202 are also one clock delay circuits. Together they form a series of 4 data points of consecutive pixels to the interpolator in block 203. The interpolator is used to create a new pixel value that is equal to or somewhere between the $2^{nd}$ and $3^{rd}$ pixels coming from delay circuits 200 and 201. This interpolator uses partially weighted coefficients to create a new pixel value. It should be noted that the multipliers in interpolator block 203 must be signed multipliers because negative values may be created in some of the multipliers to create the proper interpolated value for an interpolated pixel that is on a curve instead of on a straight line.

Sync error detect block 207 is a unique sync error detector circuit based on a precisely calculated sync-to-sync line length. Its operation is illustrated in FIG. 4. The sync error detector circuit 207 determines the sync threshold position to sub-pixel accuracy as defined below. Sync error process block 208 processes the sync error measurement to determine integrated line length and line to line error. Horizontal (H) and vertical (V) sync and field identification is extracted for write memory control. The interpolation coefficients are generated in coefficient generator block 209. The formula for interpolation is described below.

The interpolation coefficients are used to calculate the new pixel value in interpolator block 203. The corrected pixel data is written into the write buffer memory block 211. The input pixel data is at a 27 MHz rate in order to achieve better interpolation. The data is decimated to 13.5 MHz going into the write buffer memory 211 in order to minimize memory size and speed requirements and comply with CCIR-601 specifications. This decimation is also necessary to accommodate the need to create two pixels between a single pair of input pixels when the line is being stretched. Write buffer memory 211 write control is written at a constant 13.5 MHz rate except for the occasional double clock or skipped clock as the interpolator shifts over pixel interpolation boundaries during time base correction. It is read in bursts of 54 MHz to write to the frame store memory block 213. That is because frame store memory 213 is built using synchronous dynamic random access memories (SDRAM) in a read/write sequence with a pause between write and read for memory bus reversal and other overhead time. The frame store memory write cycle time could be constant if a different type memory was used similar to a field FIFO type memory.

Block 215 is the output buffer memory. It is a small buffer that receives data from frame store memory 213 in 54 MHz bursts and outputs the data at a steady 13.5 MHz luminance rate. The synchronization memory control block 214 controls the address and clock enable for frame store memory 213 and read buffer memory 215. Synchronizer memory control 214 receives the H, V, and field control signals from sync error process 208 for write control addressing and from read control block 216 for read control addressing:

FIG. 4 is a diagram of a sequence of two video synchronizing pulses with expanded views of a portion of the leading edge of the sync pulse. It illustrates clock sample values above and below the sync threshold level. The sync error detection technique is described below. This technique is different from other similar digital sync error detection techniques in several ways. One prior art technique uses a digital phase locked loop technique to servo a crystal oscillator to a center point on a digital sync ramp. It simply needs to know approximately how much leading or lagging error to feed back to the VCXO. Other techniques may use dividers or other approximation techniques.

The all-digital time base correction technique is composed of three stages:
1. measuring and locking to the sync edges with a resolution of at least $\frac{1}{32}^{nd}$ of a pixel;
2. calculating the line length and equivalent pixel width required to eliminate time base errors; and
3. interpolating and decimating the corrected pixel values for each luma and chroma channel.

1. Sync Lock

The synchronization point of a video sync pulse is defined to be the mid-point between the back-porch blanking level and the sync tip, nominally a span of 0.3 volts. However, due to the fact that not all incoming signals are correctly formed, and since there is significant potential for the incoming signals to be modulated by noise, the measurement of sync must be strongly filtered and the mid-point determined by calculation. The technique for calculating sync error is illustrated in FIG. 4.

To calculate the synchronization point, a stable measurement of both back porch and sync tip levels is required. The back porch level is calculated elsewhere for use in the digital clamp circuit and is essentially an accumulation of values over the back porch which are averaged to determine the centerline value. Sync tip level can be calculated by the same method. If necessary, additional stability can be introduced into this measurement by averaging the current line with some fraction of the previous line to make the calculation recursive. This could be required under conditions of extreme noise. Once the back-porch and sync-tip levels are known, the synchronization point is a simple average of the two.

By the above method alone, the location of sync can be measured to within a pixel clock count, but to correct time base errors, a measurement with finer resolution is required. Sync error detect circuit 207 detects the sub-pixel error in the following manner. Since the sync waveform is very nearly linear in the region of the synchronization point, the sub-pixel measurement can be accomplished by linear interpolation of the synchronization point from the points at the clock ticks on either side. However, the normal method for making this calculation requires a division that is not readily implemented with good efficiency at video clock speeds within digital logic chips. To avoid this awkward calculation, the amplitude gap between the measurement on the clock before the synchronization point and the one after it can be run through a multiply operation where the multiplier is adjusted by a servo loop so that the result is always 64. Applying the same multiplier to the amplitude of the point before the synchronization point will then give the location of the synchronization point in $64^{th}$ pixels, accurate to about $\frac{1}{32}^{nd}$ of a pixel. In the preferred embodiment, an iterative divider circuit is used which is functionally equivalent to this method.

Because of noise effects, it is not possible to rely on any one measurement being accurate. Sync error process block 208 helps to compensate for this problem. The measured position of the synchronization point can be averaged with a calculated position based on a number of previous sync pulses. This will stabilize the calculation against noise and allow a measurement of average sync position. The calculated position of the synchronization point can be determined by average line length (in sub-pixels) to the previous sync position. The average line length is calculated recursively from the current line length. The current line length is:

length=(clock count between syncs)*64+(subpixel location of sync on this line)+64—(subpixel location of sync on the previous line).

To further stabilize the measurement, a "sync valid" criterion must be established. If there is no sync in the vicinity of the calculated sync point, or if the points near the min-amplitude point are non-monotonic, the current sync is declared invalid and the calculated length is used in its place.

2. Time Base Error Measurement

In the absence of time base errors, the distance between sync points in 27 MHz sampled National Television System Committee (NTSC) signals should be exactly 1716 clocks. Since the clock in this system is locked to burst, if time base errors exist, there will be a variance from that count. The line length variation is nominally on the order of a few subpixels, however under extreme conditions, such as high speed rewind, the variance can be around 30% of a nominal line. A corrected signal must be restored to exactly 1716 clocks.

To make the correction, the signal must be expanded or compressed evenly over the whole line by a factor of:

size=(line length)/(1716).

This calculation must be made to a precision of 11 bits past the subpixel precision required. Since the size number will be in the range of 0.7 to 1.4, 17 bits of positional accuracy are required.

3. Correction by Interpolation and Decimation

Since the desired pixel amplitude values lie between the clocked values when time base errors exist, the desired values must be derived from the available values by some form of interpolation. Using a four point (cubic) interpolation, the errors inherent in interpolation can be held to less than 0.2 dB if the sampling rate is at 27 MHz and the highest frequency of interest is 6.75 MHz.

If the size number is exactly equal to one (an indication of a fixed skew, not a true TBC error), an interpolation would be made between each pair of pixels to extract the 1716 desired values. If the size is different than one, then either two interpolations must occasionally be made between the same two pixels, or some pixel pairs will have no interpolations made between them. If the entire data stream needed to operate at 27 MHz, this fact would create a data flow problem. However, since luma is required at only 13.5 MHz, the combination of decimation with interpolation eliminates the problem.

In a four point interpolation technique, the desired result must lie between the two center points, and one must know the offset of the calculated point from one of the given points. The sync measurement calculation above provides a starting offset in the measurement of sync position from the clocked value before it. The offset for succeeding interpolations can be determined by successive addition of the size number to the initial offset number. The fractional part of the result is the new offset. To insure that the output video remains aligned with the input video, this accumulation of size must be compared with the new calculated offset number. A variation is an indication of a phase error which must also be factored in to the next line length calculation. Decimation can be controlled by examining the integer part of the result of the size accumulation. If the integer part is zero, the next value is valid. If the integer part is one, the next value is decimated. If the integer part is two, two succeeding values are decimated. During decimation, accumulation of the size number continues, but after the last decimation, the integer part of the result is cleared prior to the next decimation measurement.

The actual interpolation is made according to the following formulas. First, a matrix M is calculated from the four basis points (numbered 0,1,2, and 3) of the interpolation for each chroma and luma channel:

$M_0 = 2*Value_1$ $M_1 = 6*Value_2 - 3*Value_1 - 2*Value_0 - Value_3$ $M_2 = 9*(Value_2 + Value_0 - 2*Value_1)$ $M_3 = 9*(Value_3 - 3*Value_2 - Value_0 + 3*Value_1)$ Then an interpolation number X must be calculated as offset/3. By careful manipulation of previous calculations, this factor of a third can be pushed back into the calculation of size and offset and so eliminated at this point. The value X is common to all luma and chroma channels.

The interpolation is then calculated as:

$$Ival=((M_3*X+M_2)*X+M_1)*X+M_0$$

At each stage of this calculation, 11 bit precision must be maintained. At the final stage, rounding must be used down to the 10 bit value needed for CCIR 601 standard video. Intermediate stages can use truncation to discard unneeded bits.

Those skilled in the art will appreciate that many modifications to the preferred embodiment of the present invention are possible while still obtaining the beneficial results of the present invention. It will also be apparent that some of the desired benefits of the present invention can be obtained by selecting some of the features of the present invention without using other features. Thus, the foregoing description is provided as illustrative of the principles of the present invention and not in limitation thereof, since the scope of the present invention is defined by the claims.

Additionally corresponding structures, materials, acts, and equivalents of any means plus function elements in the claims below are intended to include any structure, material, or acts for performing the functions in combination with any other claimed elements as specifically claimed.

While the invention has been particularly shown and described with reference to a preferred embodiment, it will be understood by those skilled in the art that various changes in form and detail may be made without departing from the spirit and scope of the present invention.

What is claimed is:

1. A time base corrector apparatus for removing time base errors from composite video signals, comprising:
    a digital sync error detector that detects a time that a sync crosses a sync detect threshold to determine the exact start of each line of video in pixel clock and sub-clock increments;
    a sync error process logic circuit coupled to the sync error detector for calculating a correction required to reposition each video line and stretch or compress the video line to correct for time base errors;
    a luminance interpolator for receiving luminance data from an output of a digital comb filter and cooperative with the sync error process logic circuit to calculate corrected pixel values for the luminance output of the digital video signal;
    a pair of chrominance interpolators for receiving two demodulated data streams that are generated from a chrominance output of the digital comb filter, and cooperative with the sync error process logic circuit to calculate corrected pixel values for the chrominance output of the digital video signal; and
    a write buffer for receiving a decimated digital video signal output from an associated interpolator.

2. The time base corrector apparatus of claim 1 further comprising:
    a frame buffer memory for receiving the corrected digital video signal from the write buffer; and
    a read buffer memory for receiving the corrected digital video signal from the frame buffer and outputting the corrected digital video signal at a steady rate.

3. The time base corrector apparatus of claim 2 further comprising:
    a synchronizer memory control block for controlling an address and a clock enable for the frame store memory and read buffer memory, said synchronizer memory control block receiving horizontal, vertical and field control signals from the sync error process logic for write control addressing.

4. The time base corrector apparatus of claim 1 wherein the sync error detector measures a back porch level and a sync tip level to calculate a synchronization point to within one pixel clock count, and includes an iterative divider circuit to determine an amplitude gap between a measured value on the clock both immediately before and after the synchronization point and to apply a multiply operation to locate the synchronization point to $\frac{1}{32}^{nd}$ of a pixel.

5. The time base corrector apparatus of claim 1 wherein the sync error process logic calculates a position of the synchronization point to compensate for noise effects by determining an average line length to the previous synchronization point.

6. The time base corrector apparatus of claim 5 wherein the sync error process logic determines the average line length recursively from a current line length.

7. The time base corrector apparatus of claim 6 wherein the sync error process logic determines the current line length based on the clock counts between syncs, the sub-pixel locations of the synchronization point both on the current line and on the previous line.

8. The time base corrector apparatus of claim 7 wherein the sync error process logic expands or compresses the video signal over an entire length of the video line based on the distance between synchronization points in a sampled video signal.

9. The time base corrector apparatus of claim 8 wherein the sync error process logic expands or compresses the video signal over the entire length of a video line by applying a size factor which is a ratio of the current line length to clock counts between synchronization points.

10. The time base corrector apparatus of claim 1 wherein each interpolator uses a polynomial interpolation technique.

11. The time base corrector apparatus of claim 1 wherein each interpolator uses a multiple point digital filter with a plurality of loadable coefficients that determine the delay of the digital filter.

12. The time base corrector apparatus of claim 10 wherein each interpolator uses four-point cubic interpolation technique.

13. The time base corrector apparatus of claim 1 further including a coefficient generator coupled to the sync error process logic for determining a plurality of coefficients for use by each interpolator.

14. The time base corrector apparatus of claim 13 wherein each interpolator first determines a weighted matrix from the plurality of coefficients and an offset value based on a difference between a calculated sync position and a measured sync position and then applies an interpolation formula using the matrix values and offset to determine an interpolated value.

15. The time base corrector apparatus of claim 14 wherein a new offset value for each succeeding interpolation is determined by the addition of a size factor, calculated as a ratio of a current line length to the number of clock counts between syncs, to an initial offset value, and then using a fractional part of the sum as the new offset value.

16. The time base corrector apparatus of claim 15 wherein each chrominance interpolator examines an integer part of the sum to control decimation of the digital video signal prior to outputting the digital video signal to the write buffer.

17. The time base corrector apparatus of claim 16 wherein if the integer part of the sum is zero, the next output value is valid; if the integer part is one, the next value is decimated; and if the integer part is two, the next two values are decimated.

18. The time base corrector apparatus of claim 1 further comprising a voltage-controlled crystal oscillator that is locked to a chrominance burst of the input video signal and is used in digitizing the input video signal, in comb filtering of the digitized video signal to generate luminance and chrominance signals and in demodulating the chrominance signals.

19. A method for removing time base errors from composite video signals, comprising:

determining the exact start of each line of video in pixel clock and sub-clock increments by a digital sync error detector detecting a time that a sync crosses a sync detect threshold;

calculating a correction required to reposition each video line and stretch or compress the video line to correct for time base errors by a sync error process logic circuit;

receiving luminance data from an output of a digital comb filter, receiving a plurality of calculated values from the sync error process logic circuit by a luminance interpolator, and calculating corrected pixel values for the luminance output of the digital video signal based on the luminance data and the plurality of calculated values;

receiving two demodulated data streams that are generated from a chrominance output of the digital comb filter, receiving a plurality of calculated values from the sync error process logic circuit by a pair of chrominance interpolators, and calculating corrected pixel values for the chrominance output of the digital video signal base on the two demodulated data streams and the plurality of calculated values;

decimating the digital video signal output from each chrominance interpolator; and receiving a decimated digital video signal output from an associated interpolator into a write buffer.

20. The method for removing time base errors from composite video signals of claim 19 further comprising:

receiving a corrected digital video signal from the write buffer into a frame buffer memory;

receiving the corrected digital video signal from the frame buffer memory into read buffer memory; and outputting the corrected digital video signal at a steady rate.

21. The method for removing time base errors from composite video signals of claim 19 further comprising:

controlling an address and a clock enable for the frame store memory and read buffer memory by a synchronizer memory control block; and receiving horizontal, vertical and field control signals from the sync error process logic by the synchronizer memory control block for write control addressing.

22. The method for removing time base errors from composite video signals of claim 19 further comprising:

measuring a back porch level and a sync tip level to calculate a synchronization point to within one pixel clock count by a sync error detector; determining an amplitude gap between a measured value on the clock both immediately before and after the synchronization point by an iterative divider circuit; and applying a multiply operation to locate the synchronization point to $1/32^{nd}$ of a pixel.

23. The method for removing time base errors from composite video signals of claim 19 further comprising calculating a position of the synchronization point by the sync error process logic to compensate for noise effects by determining an average line length to the previous synchronization point.

24. The method for removing time base errors from composite video signals of claim 23 further comprising determining the average line length recursively from a current line length by the sync error process logic.

25. The method for removing time base errors from composite video signals of claim 24 further comprising determining the current line length by the sync error process logic based on the clock counts between syncs, the sub-pixel locations of the synchronization point both on the current line and on the previous line.

26. The method for removing time base errors from composite video signals of claim 25 further comprising expanding or compressing the video signal over an entire length of the video line by the sync error process logic based on the distance between synchronization points in a sampled digital video signal.

27. The method for removing time base errors from composite video signals of claim 26 wherein the act of expanding or compressing the video signal over the entire length of a video line by the sync error process logic further comprises applying a size factor which is a ratio of the current line length to clock counts between synchronization points.

28. The method for removing time base errors from composite video signals of claim 19 further comprises using a polynomial interpolation technique by each interpolator.

29. The method for removing time base errors from composite video signals of claim 19 further comprising using a multiple point digital filter with a plurality of loadable coefficients that determine the delay of the digital filter by each interpolator.

30. The method for removing time base errors from composite video signals of claim 28 further comprising using a four-point cubic interpolation technique by each interpolator.

31. The method for removing time base errors from composite video signals of claim 19 including determining a plurality of coefficients for use by each interpolator by a coefficient generator.

32. The method for removing time base errors from composite video signals of claim 31 further comprising:

determining a weighted matrix from the plurality of coefficients and an offset value based on a difference between a calculated sync position and a measured sync position and;

applying an interpolation formula using the matrix values and offset to determine an interpolated value.

33. The method for removing time base errors from composite video signals of claim 32 further comprising determining a new offset value for each succeeding interpolation by adding a size factor, calculated as a ratio of a current line length to the number of clock counts between syncs, to an initial offset value, and then using a fractional part of the sum as the new offset value.

34. The method for removing time base errors from composite video signals of claim 33 further comprising examining an integer part of the sum to control decimation of the digital video signal prior to outputting the digital video signal to the write buffer.

35. The method for removing time base errors from composite video signals of claim 34 wherein if the integer part of the sum is zero, outputting the next output value; if the integer part is one, decimating the next output value; and if the integer part is two, decimating the next two output values.

36. The method for removing time base errors from composite video signals of claim 19 further comprising locking a voltage-controlled crystal oscillator to a chrominance burst of the input video signal and using th voltage-controlled oscillator in digitizing the input video signal, in comb filtering of the digitized video signal to generate luminance and chrominance signals and in demodulating the chrominance signals.

* * * * *